Patented Mar. 15, 1949

2,464,740

UNITED STATES PATENT OFFICE 2,464,740

ALKENYL 3-(ALKENOXY)-ALKANOATES

David E. Adelson, Berkeley, Calif., assignor to Shell Development Company, San Francisco, Calif., a corporation of Delaware No Drawing. Application March 25, 1944, Serial No. 528,171

8 Claims. (Cl. 260—484)

This invention relates to a new class of organic compounds having particularly useful and valuable properties. More particularly, the invention pertains to alkenyl 3-(alkenoxy)-alkanoates and specifically to allyl 3-alloxy-propanoate.

The chemical structure of the compounds of the invention is characterized by being both a monoether and a monoester as well as having two olefinically unsaturated groups in the molecule. This combination of functional groups in a single molecule is responsible for the unique properties of the new class of compounds.

It was heretofore known that unsaturated diesters of saturated dicarboxylic acids like diallyl oxalate, diallyl malonate, diallyl succinate, and diallyl adipate could be polymerized. Such unsaturated diesters contain two alkenyl radicals both of which are linked by carboxyl ester groups in the molecule. Polymerization of these compounds occurs through the olefinic radicals. Owing to the fact that these compounds contain two olefinic radicals linked by carboxyl ester groups, it is known that the compounds polymerize to give three-dimensional polymers which are characterized by being infusible and also being insoluble in all non-disintegrating solvents. As would be expected, it is reported by Rothrock (U. S. 2,221,663), that diallyl 2-alloxybutanedioate polymerizes to a hard, brittle product since this compound also contains two alkenyl groups linked in the molecule by two carboxyl groups. It was therefore surprising to find that the alkenyl 3-alkenoxy-alkanoates of the invention will polymerize to insoluble and infusible polymers although these compounds contained only one alkenyl group linked in the molecule by a carboxyl group, i. e. they are monoesters rather than diesters known heretofore. These polymers and methods for their formation are described and claimed in copending applications Serial No. 410,164, filed September 9, 1941, now abandoned, and Serial No. 520,688, filed February 1, 1944, now U. S. Patent No. 2,440,237, of which this application is a continuation-in-part for the reason that the monomeric compounds of the present invention are described therein. While polymers and methods of polymerization of such compounds are described and claimed in these copending joint applications of myself and Hans Dannenberg, the present application is concerned with a different invention which was disclosed therein, namely, the new monomeric compounds of the class known as the alkenyl 3-alkenoxyalkanoates which were discovered by me alone and are my sole invention.

I am aware that certain compounds which are devoid of olefinic unsaturation, like some alkyl 3-alkoxyalkanoates, are known. However, such compounds are incapable of polymerizing since they are saturated. Moreover, in being saturated they cannot react with chlorine to give chlorine addition products, or with hypochlorous acid to give chlorhydrin derivatives, or with maleic anhydride to give complex carboxylic acid derivatives, or with sulfur dioxide to give sulfones, as can the alkenyl 3-alkenoxyalkanoates of the invention. The olefinic bonds in the compounds of the invention make such reactions possible and the compounds are accordingly valuable chemical intermediates.

The doubly occurring unsaturation of the compounds in conjunction with the presence therein of both an ethereal oxygen atom and a carboxylic acid ester group gives valuable solvent properties to the compounds. A greater variety of substances are dissolved by the lower liquid compounds of the invention than is the case with the corresponding saturated compounds. The higher compounds of the invention are also particularly useful as plasticizers for resins and cellulose derivatives because of the multiplicity of functional groups of the compounds. This variety of functional groups makes them compatible with a large variety of such plastic materials.

The lower members of the series are pleasant smelling liquids, while the higher members are crystalline solids.

The 2-alkenyl 3-(2-alkenoxy)-alkanoates form a preferred subclass of the compounds of the invention and include such particular representative compounds as:

Allyl 3-alloxypropanoate
Allyl 3-alloxybutanoate
Allyl 3-alloxypentanoate
Allyl 3-alloxyhexanoate
Allyl 3-alloxyoctanoate
Allyl 3-alloxydecanoate
Allyl 3-alloxydodecanoate
Allyl 3-alloxyhexadecanoate
Allyl 3-alloxyoctadecanoate
2-methyl-2-propenyl 3-(2-methyl-2-propenoxy)-propanoate
2-methyl-2-propenyl- 3-(2-methyl-2-propenoxy)-butanoate
2-methyl-2-propenyl 3-(2-methyl-2-propenoxy)-pentanoate
2-methyl-2-propenyl 3-(2-methyl-2-propenoxy)-octanoate 2-methyl-2-propenyl 3-(2-methyl-2-propenoxy)-decanoate
2-methyl-2-propenyl 3-(2-methyl-2-propenoxy)-hexadecanoate
2-butenyl 3-(2-butenoxy)-propanoate
2-butenyl 3-(2-butenoxy)-butanoate
2-butenyl 3-(2-butenoxy)-hexanoate
2-butenyl 3-(2-butenoxy)-decanoate
2-butenyl 3-(2-butenoxy)-octadecanoate
2-pentenyl 3-(2-pentenoxy)-propanoate
2-pentenyl 3-(2-pentenoxy)-butanoate
2-pentenyl 3-(2-pentenoxy)-hexanoate
2-pentenyl 3-(2-pentenoxy)-decanoate
2-decenyl 3-(2-decenoxy)-propanoate
2-decenyl 3-(2-decenoxy)-butanoate
2-decenyl 3-(2-decenoxy)-pentanoate
2-decenyl 3-(2-decenoxy)-octanoate
2-decenyl 3-(2-decenoxy)-nonanoate
3-methyl-2-butenyl 3-(3-methyl-2-butenoxy)-propanoate
3-methyl-2-butenyl 3-(3-methyl-2-butenoxy)-butanoate
3-methyl-2-butenyl 3-(3-methyl-2-butenoxy)-octanoate
3-methyl-2-butenyl 3-(3-methyl-2-butenoxy)-dodecanoate
2,3-dimethyl-2-butenyl 3-(2,3-dimethyl-2-butenoxy)-propanoate
2,3-dimethyl-2-butenyl 3-(2,3-dimethyl-2-butenoxy)-octanoate
2,3-dimethyl-2-butenyl 3-(2,3-dimethyl-2-butenoxy)-decanoate
2,3-dimethyl-2-butenyl 3-(2,3-dimethyl-2-butenoxy)-pentanoate
2-chloro-2-propenyl 3-(2-chloro-2-propenoxy)-propanoate
2-chloro-2-propenyl 3-(2-chloro-2-propenoxy)-pentanoate
2-chloro-2-propenyl 3-(2-chloro-2-propenoxy)-heptanoate
2-chloro-2-propenyl 3-(2-chloro-2-propenoxy)-tetradecanoate
3-chloro-2-propenyl 3-(2-chloro-2-propenoxy)-propanoate
3-chloro-2-propenyl 3-(2-chloro-2-propenoxy)-hexanoate
3-chloro-2-propenyl 3-(2-chloro-2-propenoxy)-octanoate
2-chloro-2-pentenyl 3-(2-chloro-2-pentenoxy)-propanoate
2-chloro-2-pentenyl 3-(2-chloro-2-pentenoxy)-pentanoate
2-chloro-2-pentenyl 3-(2-chloro-2-pentenoxy)-decanoate
2-chloro-2-pentenyl 3-(2-chloro-2-pentenoxy)-octadecanoate
2-bromo-3-methyl-2-butenyl 3-(2-bromo-3-methyl-2-butenoxy)-propanoate
2-bromo-3-methyl-2-butenyl 3-(2-bromo-3-methyl-2-butenoxy)-butanoate
Allyl 3-alloxy-2-methylpropanoate
2-methyl-2-propenyl 3-(2-methyl-2-propenoxy)-2-methylpropanoate
2-butenyl 3-(2-butenoxy)-2-methylpropanoate
2-chloro-2-propenyl 3-(2-chloro-2-propenoxy)-2-methylpropanoate
Allyl 3-alloxy-2-methylbutanoate
Allyl 3-alloxy-4,4-dimethylbutanoate The foregoing compounds are symmetrical ether-esters and the preferred subclass also includes unsymmetrical compounds such as Allyl 3-(2-methyl-2-propenoxy)-propanoate
2-methyl-2-propenyl 3-alloxypropanoate
Allyl 3-(2-methyl-2-propenoxy)-2-methylpropanoate
2-pentenyl 3-(2-butenoxy)-propanoate
2-decenyl 3-alloxyoctanoate
4,4-dimethyl-2-pentenyl 3-(2-methyl-2-propenoxy)-2-methylpropanoate Other representative members of the class of alkenyl 3-alkenoxyalkanoates include such compounds as:

Vinyl 3-vinoxypropanoate
Vinyl 3-vinoxy-2-methylpropanoate
Vinyl 3-vinoxyhexanoate
3-butenyl 3-(3-butenoxy)-propanoate
3-butenyl 3-(3-butenoxy)-pentanoate
3-butenyl 3-(3-butenoxy)-octadecanoate
3-pentenyl 3-(3-pentenoxy)-propanoate
3-pentenyl 3-(3-pentenoxy)-hexanoate
3-pentenyl 3-(3-pentenoxy)-decanoate
1-propenyl 3-(1-propenoxy)-propanoate
1-propenyl 3-(1-propenoxy)-2-methylpropanoate
2-methyl-1-propenyl 3-(2-methyl-1-propenoxy)-propanoate
3-buten-2-yl 3-(3-buten-2-oxy)-propanoate
5-hexenyl 3-(5-hexenoxy)-propanoate
9-octadecenyl 3-(9-octadecenoxy)-butanoate
3-methyl-3-butenyl 3-(3-methyl-3-butenoxy)-pentanoate
2-chloro-1-propenyl 3-(2-chloro-1-propenoxy)-propanoate
2-bromo-9-octadecenyl 3-(2-bromo-9-octadecenoxy)-octadecanoate Other representative mixed or unsymmetrical ether-esters of the invention include such compounds as:

Vinyl 3-alloxypropanoate
Allyl 3-vinoxypropanoate
1-propenyl 3-(2-butenoxy)-2-methylpropanoate
3-penten-2-yl 3-(7-decenoxy)-propanoate
Vinyl 3-(4-hexenoxy)-3-methylbutanoate
9-decenyl 3-vinoxypropanoate
2-chloropropenyl 3-vinoxypropanoate The compounds of the invention can be prepared by several methods. For example, the appropriate 3-chloroalkanoic acid can be reacted with the sodium alcoholate of the unsaturated alcohol which is desired to be introduced as the ethereal substituent in the compound. This reaction will give sodium 3-alkenoxyalkanoate which can be converted to 3-alkenoxyalkanoic acid by treatment with a mineral acid like aqueous hydrochloric acid. The free ethereal acid is then esterified with an alkenol to give the desired alkenyl 3-alkenoxyalkanoate. While this method is suitable for preparing the compounds of the invention, it has a serious disadvantage; this is that the 3-chloroalkanoic acids cannot be prepared by direct methods from an alkanoic acid. When the alkanoic acid is halogenated with chlorine or bromine, substitution occurs at the 2-position rather than the 3-position. Consequently, indirect or more complex methods must be used to obtain the 3-halo-alkanoic acids needed for this procedure.

By reason of this disadvantage, I prefer to manufacture the compounds of the invention by a different method. When an alkyl 2-alkenoate is heated with the appropriate alkenol in the presence of a small amount of sodium alcoholate as catalyst and a minor amount of polymerization inhibitor to prevent polymerization of the unsaturated ester reactant, the alkenol adds into the olefinic linkage of the alkyl 2-alkenoate and simultaneously therewith, the alkenol also exchanges with the alkyl group of the ester so as to liberate the alkanol. By boiling the reaction mixture and distilling therefrom the liberated alkanol, the product produced is the desired alkenyl 3 - alkenoxyalkanoate. For example, about 96 gms. of methyl propenoate having 0.2 gm. of hydroquinone dissolved therein are mixed with 215 gms. of allyl alcohol in which 2.2 gms. of clean metallic sodium had been dissolved. Upon mixing, an immediate green color develops with liberation of much heat. The reaction mixture becomes turbid and brown and it is necessary to cool the contents of the reaction vessel containing the reaction mixture. After the initial reaction subsides, the reaction mixture is distilled and about 31 cc of methanol is recovered as distillate after which 100 cc of allyl alcohol is removed. Water is then added to the reaction mixture and two extractions thereof are made with isopentane. The extract is distilled at normal pressure to a still-head temperature of 32° C. and the residue is then distilled in vacuo. About 100 gms. of allyl 3-alloxypropanoate is recovered which boils between 74.2° C. and 75.8° C. at 4–5 mm. pressure. The product has a density (20/4) of 0.9875 and a refractive index (20/D) of 1.4424. Its ester value (equiv. per 100 gms.) is 0.600 as compared to a theoretical value of 0.588. The molecular refraction is 45.63 in comparison with the calculated value of 46.13.

In a similar manner, 2-methyl-2-propenyl 3-(2-methyl-2-propenoxy)-propanoate is obtained by reacting 2-methyl-2-propenol with methyl propenoate. By substituting methyl 2-methylpropenoate for methyl propenoate, the product obtained is 2-methyl-2-propenyl 3-(2-methyl-2-propenoxy)-2-methylpropanoate. The reaction of methyl 2-butenoate with 2-chloro-2-propenol gives 2-chloro-2-propenyl 3-(2-chloro-2-propenoxy)-butanoate and 3-pentenyl 3-(3-pentenoxy)-2,3-dimethylhexanoate is obtained by reacting 3-pentenol with methyl - 2,3 - dimethyl-2-hexenoate. In like manner, reaction of 3-butene-2-ol with methyl propenoate produces 3-butene-2-yl 3-(3-butenoxy)-propanoate. The method is also applicable for producing higher members of the class like 9-octadecenyl 3-(9-octadecenoxy)-octanoate which is obtained by reacting 9-octadecenol with methyl 2-octenoate. The foregoing examples illustrate the manner for preparing typical symmetrical ether-ester compounds of the invention. Unsymmetrical compounds are obtained by variations of the method.

Thus, the compound like 2-butenyl 3-alloxypropanoate is prepared by mixing together sufficient allyl alcohol with methyl propenoate so that the reaction will produce allyl 3-alloxypropanoate. The reaction mixture is boiled and the liberated methanol is removed as distillate until its evolution ceases. The reaction product in the reaction mixture at this stage is allyl 3 - alloxy - propanoate. The 2 - butenol in an amount sufficient to exchange with the esterified allyl alcohol is then added to the reaction mixture. Since allyl alcohol boils at a lower temperature than the 2-butenol, boiling with distillation gives allyl alcohol as distillate and the product obtained upon completion of evolution of the allyl alcohol is the desired 2-butenyl 3-alloxypropanoate. This product is separated from the reaction mixture and purified in like manner to that of the allyl 3-alloxypropanoate described above. In a similar manner, 4-methyl-3-penten-2-yl 3-(2 - methyl - 2 - propenoxy)-2-methylpropanoate is prepared by first reacting methyl 2-methylpropenoate with 2-methyl-2-propenol and then reacting the product therefrom with 4-methyl-3-penten-2-ol. Also, 5-hexenyl 3-(2-butenoxy)-butanoate is obtained by reacting methyl 2-butenoate with 2-butenol followed by reaction with 5-hexanol. The success of this method depends upon the fact that the unsaturated ester radical can be exchanged without the exchange occurring with the unsaturated ether radical. The method is suitable for preparation of alkenyl 3-alkenoxyalkanoates in which the alkenol giving the alkenyl radical of the ether-ester compound is higher boiling than the alkenol giving the alkenoxy radical.

In order to produce compounds in which the alkenol giving the alkenyl radical is lower boiling than the alkenol giving the alkenoxy radical, modification of the method is necessary. These compounds are obtained by first reacting a methyl 2-alkenoate with the appropriate alkenol desired to be present as the alkenoxy radical in the final compound. Thus, methyl propenoate is reacted with 2-butenol and the product obtained is 2-butenyl 3-(2-butenoxy)-propanoate. This product is then saponified with sodium hydroxide, the saponified reaction mixture treated with hydrochloric or sulphuric acid to liberate the free organic acid, and the 3-(2-butenoxy)-propanoic acid separated and purified. This free ether-acid is then esterified with the desired alkenol such as allyl alcohol to give allyl 3-(2-butenoxy)-propanoate. The esterification is effected in the usual manner by methods so well known in the art that they need not be redescribed here. This method gives 2-butenyl 3-(4-methyl-3-buten-2-oxy)-2-methylpropanoate by first reacting methyl 2-methylpropenoate with 4-methyl-3-butene-2-ol followed by saponification and recovery of the free ether-acid which is then esterified with the 2-butenol. Similarly ethyl 2-pentenoate is reacted with 9-octadecenol and the ether-acid obtained from saponification of the formed ester is esterified with allyl alcohol so that the final product is allyl 3-(9-octadecenoxy)-pentanoate.

The above-described method of esterification of the alkenols with the ether-acid using a mineral acid as catalyst is suitable for most of the alkenols.

However, a subclass of alkenols which are esterified with the ether-acids require a more special method for best results. Thus, 2-methyl-2-propenol and like alkenols which contain an unsaturated tertiary carbon atom linked directly to the saturated carbon atom having the hydroxyl group linked directly thereto, are subject to rearrangement in the presence of the strong acid employed as catalyst in the esterification step. Such a strongly acidic medium like that of the above-described reaction mixtures which contain a mineral acid, causes 2-methyl-2-propenol to rearrange to isobutanal. Esterification of the ether-acid with members of this subclass of alkenols is best effected according to the general procedure described in U. S. Patent 2,164,188 which shows esterification in the absence of a mineral acid as catalyst.

The compounds of the invention which contain 1-alkenyl radical are prepared by more special methods. Vinyl 3-vinoxypropanoate is prepared by reacting acetylene with sodium 3-hydroxypropanoate in the presence of sodium hydroxide whereby sodium 3-vinoxypropanoate is produced. This reaction is effected by adding about 10% excess sodium hydroxide to 3-hydroxypropanoic acid and having present sufficient water so that the mixture is in a fluid state. The solution is then heated to around 100° C. and acetylene gas is conducted into it with vigorous stirring. Upon completion of the absorption of acetylene, the reaction mixture is neutralized with sufficient hydrochloric acid to liberate the free organic acid. The liberated 3-vinoxypropanoic acid is dissolved in toluene and 2% to 5% of a mercury salt like mercuric acetate is added. Acetylene is then bubbled into the stirred reaction mixture at 20° C. to 40° C. and after the acetylene absorption ceases the formed vinyl 3-vinoxypropanoate is recovered. In like manner, 1-buten-2-yl 3-(propen-2-oxy)-2-methylbutanoate is obtained by reacting 1-butyne with sodium or potassium 3-hydroxy-2-methylbutanoate in the presence of sodium hydroxide followed by reaction of the separated 3-(1-buten-2-oxy)-2-methylbutanoic acid with propyne in the presence of a mercuric salt catalyst.

Another method for preparing these compounds is to first prepare the 3-alkenoxyalkanoic acid by one of the methods outlined above and then react it with the appropriate alkenyl ethanoate so that acidolysis occurs. Thus, vinyl 3-alloxypropanoate is prepared by reacting 3-alloxypropanoic acid with vinyl acetate in the presence of 2% sulfuric acid, 1% mercuric acetate and 0.5% tannic acid. The reaction mixture is refluxed for 2 to 3 hours and after cooling to about 40° C., sodium acetate is added to neutralize the mineral acid. The reaction mixture is cooled to 0° C. to 15° C., filtered and flash distilled. The main product is recovered by distillation in vacuo and in this manner vinyl 3-alloxypropanoate is obtained in substantially pure state.

The foregoing methods enable any of the compounds of the invention to be prepared by appropriate choice of reactants and procedure.

I claim as my invention:
1. A monomeric alkenyl 3-alkenoxyalkanoate.
2. A monomeric 2-alkenyl 3-(2-alkenoxy)-alkanoate.
3. A monomeric 2-alkenyl 3-(2-alkenoxy)-propanoate.
4. A monomeric allyl 3-alloxyalkanoate.
5. A monomeric 2-methyl-2-propenyl 3-(2-methyl-2-propenoxy)-alkanoate.
6. Monomeric allyl 3-alloxypropanoate.
7. Monomeric allyl 3-alloxy-2-methylpropanoate.
8. Monomeric 2-methyl-2-propenyl 3-(2-methyl-2-propenoxy)-propanoate.

DAVID E. ADELSON.

REFERENCES CITED

The following references are of record in the file of this patent:

UNITED STATES PATENTS

| Number | Name | Date |
| --- | --- | --- |
| 1,823,528 | Buelow | Sept. 15, 1931 |
| 2,021,873 | Nicodemus et al. | Nov. 19, 1935 |
| 2,164,188 | Groll et al. | June 27, 1939 |
| 2,221,663 | Rothrock | Nov. 12, 1940 |
| 2,302,618 | Loder | Nov. 17, 1942 |
| 2,346,612 | Rothrock | Apr. 11, 1944 |
| 2,393,000 | Seeger | Jan. 15, 1946 |